United States Patent
Han et al.

(10) Patent No.: US 10,114,268 B2
(45) Date of Patent: Oct. 30, 2018

(54) ACOUSTO-OPTIC DEVICE, AND LIGHT MODULATOR, OPTICAL SCANNER AND DISPLAY APPARATUS USING THE ACOUSTO-OPTIC DEVICE

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Seung-hoon Han, Seoul (KR); Wan-joo Maeng, Seoul (KR); Won-taek Seo, Yongin-si (KR); Hoon Song, Yongin-si (KR); Hae-kwan Oh, Suwon-si (KR); Kee-keun Lee, Yongin-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 181 days.

(21) Appl. No.: 14/162,149

(22) Filed: Jan. 23, 2014

(65) Prior Publication Data
US 2014/0240812 A1    Aug. 28, 2014

(30) Foreign Application Priority Data
Feb. 28, 2013 (KR) .................. 10-2013-0022455

(51) Int. Cl.
*G02F 1/33* (2006.01)
*G02F 1/11* (2006.01)

(52) U.S. Cl.
CPC ............. *G02F 1/332* (2013.01); *G02F 1/11* (2013.01); *G02F 2202/30* (2013.01)

(58) Field of Classification Search
CPC .. G02F 1/11; G02F 1/33; G02B 26/10; G02B 27/0103; G02B 26/0841
(Continued)

(56) References Cited

U.S. PATENT DOCUMENTS 6,307,665 B1 * 10/2001 Kim ...................... G02F 1/0316
359/285
2009/0284826 A1 * 11/2009 Langdon ................ G02F 1/116
359/308

(Continued)

FOREIGN PATENT DOCUMENTS

KR    1020120087631 A    8/2012
KR    1020130109789 A    10/2013

OTHER PUBLICATIONS

Levent Onural et al., "New High-Resolution Display Device for Holographic Three-Dimensional Video: Principles and Simulations," Optical Engineering, vol. 33, No. 3, Mar. 1994, pp. 835 to 844.

(Continued)

*Primary Examiner* — Stephone B Allen
*Assistant Examiner* — Rahman Abdur
(74) *Attorney, Agent, or Firm* — Sughrue Mion, PLLC (57) ABSTRACT

Provided is an acousto-optic device including an elastic medium; a meta structure formed on a first surface of the elastic medium, and an elastic-wave generating unit which generates an elastic wave in the elastic medium. The meta structure includes a first layer and a second layer that is formed on the first layer. The at least one of the first layer and the second layer includes a predetermined repetitive pattern.

17 Claims, 10 Drawing Sheets

(58) Field of Classification Search
USPC .......... 359/196.1, 221.2, 285, 286, 287, 359/305–314, 1, 13, 15, 17, 21, 22, 27, 359/30, 32, 33, 35; 353/28, 30, 97, 84
See application file for complete search history.

(56) References Cited

U.S. PATENT DOCUMENTS

| | | | |
|---|---|---|---|
| 2013/0003066 A1* | 1/2013 | Han | G02F 1/0072 356/432 |
| 2014/0318596 A1* | 10/2014 | Juluri | H01L 31/07 136/244 |

OTHER PUBLICATIONS

Nanfang Yu et al., "Light Propagation with Phase Discontinuities: Generalized Laws of Reflection and Refraction," Science AAAS, vol. 334, No. 333; Oct. 21, 2011, pp. 333 to 337.
Na Liu, et al., "Infrared Perfect Absorber and Its Application as Plasmonic Sensor", Nano Letters 2010, American Chemical Society, Jun. 18,2010, pp. 2342-2348.

* cited by examiner

FIG. 12

ACOUSTO-OPTIC DEVICE, AND LIGHT MODULATOR, OPTICAL SCANNER AND DISPLAY APPARATUS USING THE ACOUSTO-OPTIC DEVICE

CROSS-REFERENCE TO RELATED APPLICATION

This application claims the benefit of Korean Patent Application No. 10-2013-0022455, filed on Feb. 28, 2013, in the Korean Intellectual Property Office, the disclosure of which is incorporated herein in its entirety by reference.

BACKGROUND

1. Field

Apparatuses consistent with exemplary embodiments relate to an acousto-optic device, and a light modulator, an optical scanner and a display apparatus using the acousto-optic device.

2. Description of the Related Art

The acousto-optic effect represents a changing optical property of a medium with a sound wave or an ultrasound wave. The light that enters the medium is modulated differently depending on the changed optical property of the medium and is output. For example, a refractive index of a medium may be periodically varied based on the acousto-optic effect and such a medium may function as a phase grating and thus diffract incident light.

In this case, since it is possible to change the intensity of diffracted light or a diffraction angle by adjusting a frequency and/or strength of a sound wave or an ultrasound wave that is applied to the medium, it is possible to implement a light modulator for modulating the amplitude of light, a scanner for deviating light, etc. by using the acousto-optic effect.

Acousto-optic devices that use a medium as it exists in nature generally have a limited range of acousto-optic converting efficiency. That is, in the case of a device using an existing acousto-optic medium, the device often needs a separate optical system because the range of diffraction angles of light output from the medium is not sufficiently wide, for example.

Interest in metamaterials has recently increased. Metamaterials are materials having optical properties that do not naturally exist in nature. A metamaterial may have a refractive index property that does not exist in nature, and has an artificial atomic unit that includes various patterns having a size of an order to a sub-wavelength. For an electromagnetic wave, a sound wave, or an ultrasound wave, metamaterials known which are capable of representing new phenomena, such as sub-wavelength focusing, negative refraction, extraordinary transmission, and/or invisibility cloaking. Examples of metamaterials include a photonic crystals, a plasmonic structures, etc.

SUMMARY

One or more exemplary embodiments may provide acousto-optic devices with high acousto-optic conversion efficiency, light modulators employing the same, optical scanners, and display apparatuses.

Additional aspects will be set forth in part in the description which follows and, in part, will be apparent from the description, or may be learned by practice of the presented embodiments.

According to an aspect of an exemplary embodiment, an acousto-optic device includes an elastic medium; a meta structure layer formed on a first surface of the elastic medium, the meta structure layer including a first layer and a second layer that is formed on the first layer and at least one of the first layer and the second layer has a predetermined repetitive pattern; and an elastic-wave generating unit applying an elastic wave to the elastic medium.

The first layer may be formed of a dielectric material, and the second layer is formed of a conductive material.

The second layer may be formed of metal, graphene, or conductive oxide.

The first layer may be formed of a conductive material, and the second layer may be formed of a dielectric material.

The first layer may be formed of metal, graphene, or conductive oxide.

The acousto-optic device may further include an intermediate layer between the elastic medium and the meta structure layer, wherein the intermediate layer may be formed of a conductive material.

The intermediate layer may be formed of a metal layer or conductive oxide.

The elastic-wave generating unit may include one or more first transducers arranged on a side adjacent to the first surface of the elastic medium and generating an elastic wave that travels in a first direction in the elastic medium.

The elastic-wave generating unit may include one or more second transducers arranged on another side adjacent to the first surface of the elastic medium and generating an elastic wave that travels in the elastic medium in a second direction perpendicular to the first direction.

The elastic-wave generating unit may include one or more first transducers arranged on the first surface of the elastic medium and generating an elastic wave that travels in the elastic medium in a first direction toward the meta structure layer across the first surface.

The elastic-wave generating unit may include one or more first transducers arranged on the first surface of the elastic medium and generating an elastic wave that travels in a second direction toward the meta structure layer across the first surface, the second direction being perpendicular to the first direction.

The at least one of the first layer and the second layer may be formed to allow a plurality of strip-shaped structures to be repetitively arranged in one direction.

The at least one of the first layer and the second layer may be formed to allow a plurality of polygonal structures, a plurality of circular structures, a plurality of ring-shaped structures, or a plurality of U-shaped structures to be repetitively arranged 2-dimensionally.

The intermediate layer may have a thickness to transmit light entering through a second surface of the elastic medium that faces the first surface of the elastic medium.

The light entering through the second surface may be modulated in amplitude or direction and exit through the meta structure layer.

The light entering through the meta structure layer may be modulated in amplitude or direction and exit through the meta structure layer.

The acousto-optic device may further include a reflective layer on the second surface of the elastic medium that faces the first surface of the elastic medium.

According to an aspect of another exemplary embodiment, an optical scanner includes the acousto-optic device described above; and a light coupling device allowing light to enter the acousto-optic device.

The light coupling device may be a lens.

According to ab aspect of another exemplary embodiment, a 2D/3D switching 3D image display apparatus includes a display panel; and an array of acousto-optic devices arranged on a front side of the display panel and deviating an image displayed on the display panel, wherein the array of acousto-optic devices includes a plurality of acousto-optic devices described above.

According to an aspect of another exemplary embodiment, a holographic display apparatus includes a light source providing light; an array of acousto-optic devices deviating light provided from the light source, the array of acousto-optic devices including a plurality of acousto-optic devices described above; and a projection optical system projecting light deviated by the array of acousto-optic devices.

According to an aspect of another exemplary embodiment, a display apparatus includes a backlight for providing image-forming light; and a display panel modulating, according to image information, the light provided from the backlight and 2-dimensionally arrayed by a plurality of acousto-optic devices described above.

In the display panel, the second layers of neighboring acousto-optic devices may have repetitive patterns of different shapes.

BRIEF DESCRIPTION OF THE DRAWINGS

These and/or other exemplary aspects and advantages will become apparent and more readily appreciated from the following description of exemplary embodiments, taken in conjunction with the accompanying drawings in which.

DETAILED DESCRIPTION

Exemplary embodiments will be described below with reference to the accompanying drawings. Like reference numerals refer to like components in the drawings and the size of each component in the drawings may be exaggerated for clarity and convenience of description.

Figure 1:
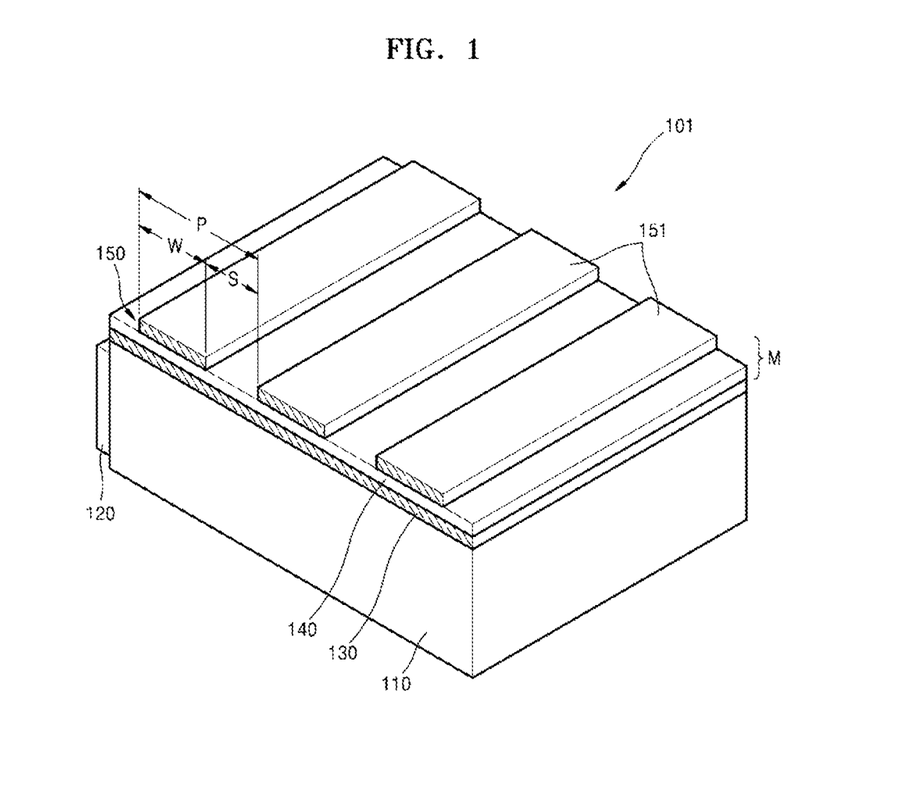
FIG. 1 is a perspective view of a schematic structure of an acousto-optic device according to an exemplary embodiment.
Figure 2:
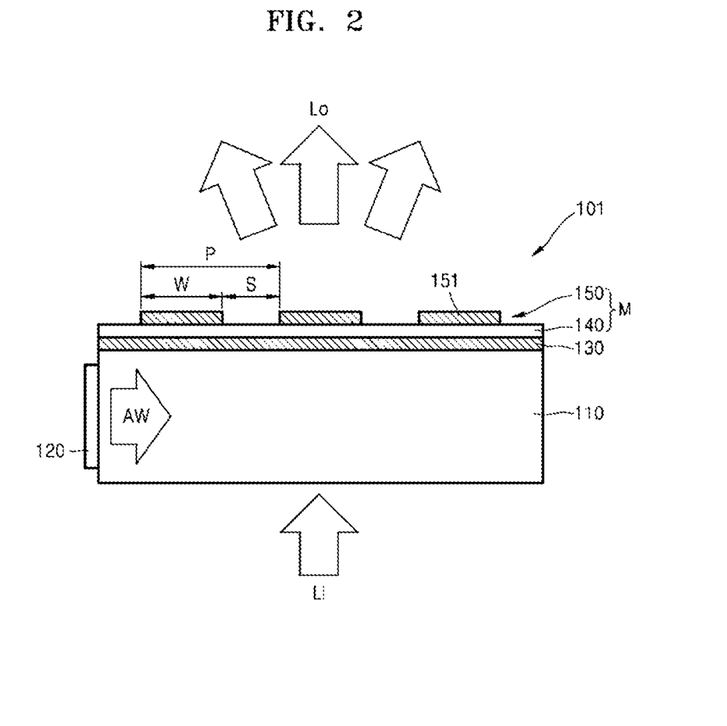
FIG. 2 is a sectional view of the acousto-optic device of FIG. 1.

FIG. 1 is a perspective view of a schematic structure of an acousto-optic device 101 according to an exemplary embodiment, and FIG. 2 is a sectional view of the acousto-optic device 101 of FIG. 1.

Referring to FIGS. 1 and 2, the acousto-optic device 101 includes an elastic medium 110, a meta structure layer M disposed on the elastic medium 110, and an elastic-wave generating unit 120 that applies an elastic wave to the elastic medium 110.

The meta structure layer M includes a first layer 140 and a second layer 150 that is formed on the first layer 140, and at least one of the first layer 140 and the second layer 150 has a periodically repeated pattern. In the drawing, the second layer 150 includes a plurality of pattern structures 151, as an example. The embodiments are not limited thereto, and first layer 140, or both the first layer 140 and the second layer 150 may include a plurality of pattern structures.

The elastic medium 110 is a material through which an elastic wave passes. If an elastic wave, such as a sound wave or an ultrasound wave, enters the elastic medium 110, the elastic wave travels in the elastic medium 110 while repeatedly performing compression and rarefaction. Thus, in response to the compression or rarefaction of the elastic wave that travels in the elastic medium 110, local changes in density and structure may occur in the meta structure layer M formed on the elastic medium 110 and these changes may lead to changes in the effective refractive index or effective absorptance of the meta structure layer M. As a result, if the elastic wave travels in the elastic medium 110, a periodic fluctuation of the refractive index occurs with the same period as that of a wavelength of the elastic wave in a direction parallel to the traveling direction of the elastic wave. For example, in response to the repeated compression and rarefaction of the sound wave, the refractive index in the elastic medium 110 repetitively increases/decreases. The incident light Li entering the elastic medium 110 having such a state exits the acousto-optic device 101 as the output light Lo that has been modulated in response to the periodic change of the elastic medium 110.

The present embodiment introduces the meta structure layer M in order to increase a change in the refractive index of the acousto-optic device 110. The meta structure layer M includes the first layer 140 and the second layer 150, wherein the second layer 150 has a predetermined repeated pattern, and a period of the pattern is shorter than the wavelength of the incident light Li. Although the pattern structure 151 forming the second layer 150 is shown in the shape of a strip, it is not limited thereto. The first layer 140 may be formed of a dielectric material, and the second layer 150 may be formed of a metal material, graphene, or conductive oxide. Alternatively, the first layer 140 may be formed of a metal material, graphene, or conductive oxide, and the second layer 150 may be formed of a dielectric material.

An intermediate layer 130 that is formed of a conductive material may be further disposed between the elastic medium 110 and the meta structure layer M. The intermediate layer 130 is introduced to further increase an acousto-optic effect and may be formed of a metal material or conductive oxide.

The acousto-optic device 101 of this embodiment operates as a transmissive type device and has a structure in which light incoming from a lower surface of the acousto-optic device 101, and thus the lower surface facing the meta structure layer M, exits through the meta structure layer M. To this end, the intermediate 130 may have a thickness to transmit incident light, and may have a smaller thickness than a skin depth with respect to the wavelength of the incident light Li, for example.

When the incident light Li exits the acousto-optic device 101, the amplitude or direction of output light Lo varies depending on whether an elastic wave AW has been applied to the meta structure layer M, and, if so, the properties of the applied elastic wave AW. As a modulation in amplitude of the elastic wave AW increases, the change range of the refractive index of the meta structure layer M increases, and the direction of the output light Lo is determined according to the wavelength of the elastic wave AW.

Figure 3:
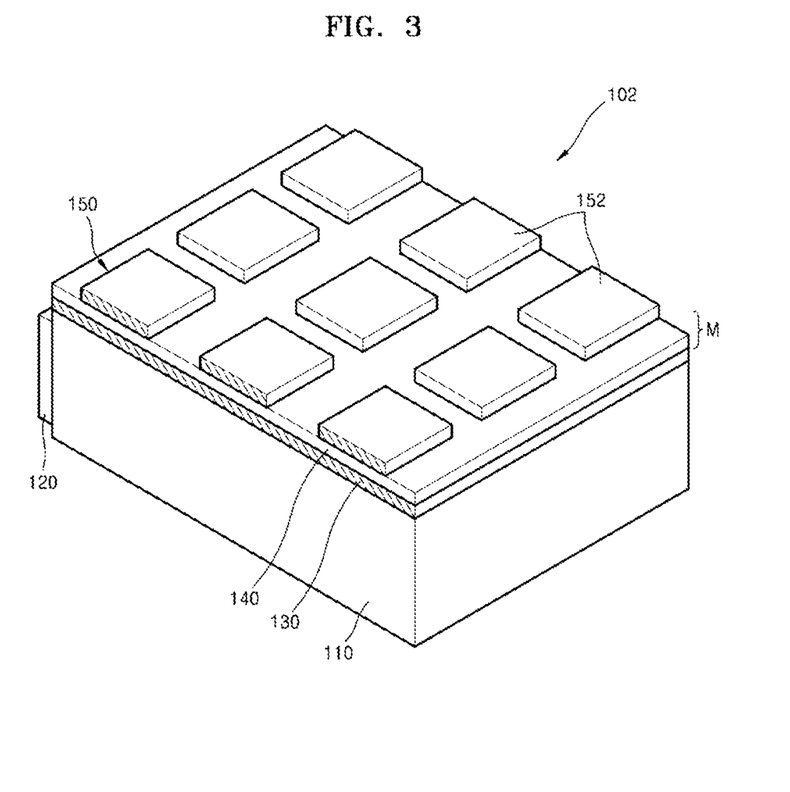
FIG. 3 is a perspective view of a schematic structure of an acousto-optic device according to another exemplary embodiment.
Figure 4A:
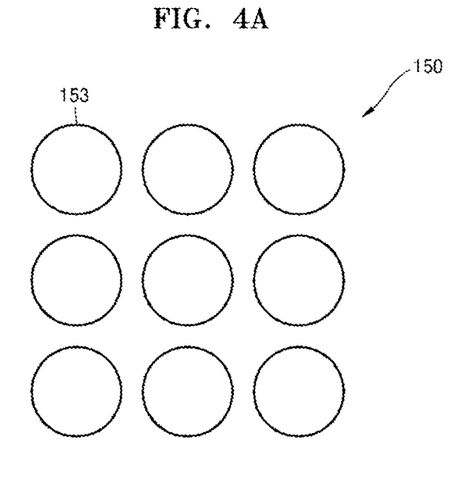
FIGS. 4A, 4B, and 4C show a variety of examples of a second layer that may be employed in the acousto-optic device of FIG. 3.
Figure 4B:
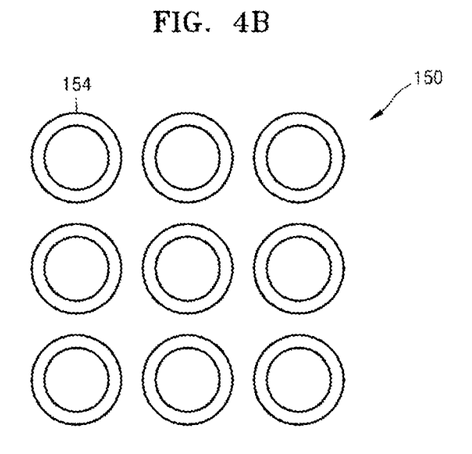
Figure 4C:
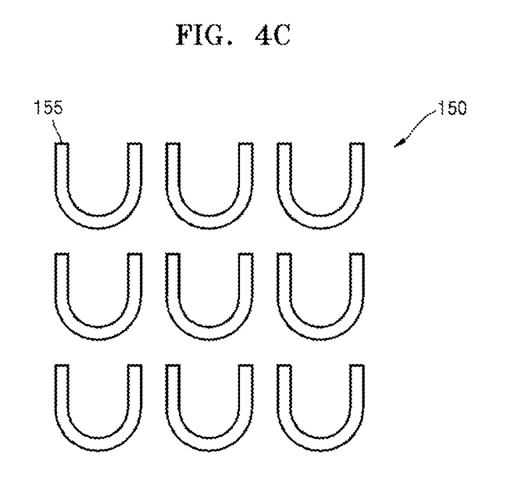
Figure 5:
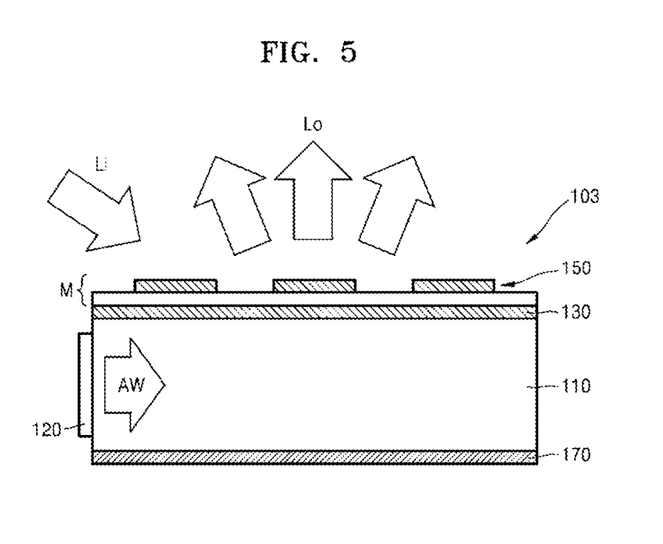
FIG. 5 is a sectional view of a schematic structure of an acousto-optic device according to another exemplary embodiment.

FIG. 3 is a perspective view of a schematic structure of an acousto-optic device 102 according to another exemplary embodiment, and FIGS. 4A to 4C are plane views of variations of a second layer 150 that may be employed in the acousto-optic device 102 of FIG. 3;

The present embodiment differs from the embodiment of FIG. 2 in the shape of the second layer 150. That is, pattern structures 152 forming the second layer 150 may have a polygonal shape and may have a quadrilateral shape as shown. However, they are examples and may differ as other polygonal structures or circular structures. For example, the second layer 150 may be formed as a pattern of circular structures 153 as shown in FIG. 4A, may be formed as a pattern of ring-shaped structures as shown in FIG. 4B, and may be formed as a pattern of U-shaped structures 155 as shown in FIG. 4C. Such pattern structures could be made in relief or engraved FIG. 5 is a sectional view of a schematic structure of an acousto-optic device 103 according to another exemplary embodiment.

The present embodiment has a structure in which the acousto-optic device 103 operates as a reflective type device. That is, light Li entering through the meta structure layer M exits therethrough. To this end, a reflective metal layer 170 may be further disposed on the bottom of the elastic medium 110.

Figure 6:
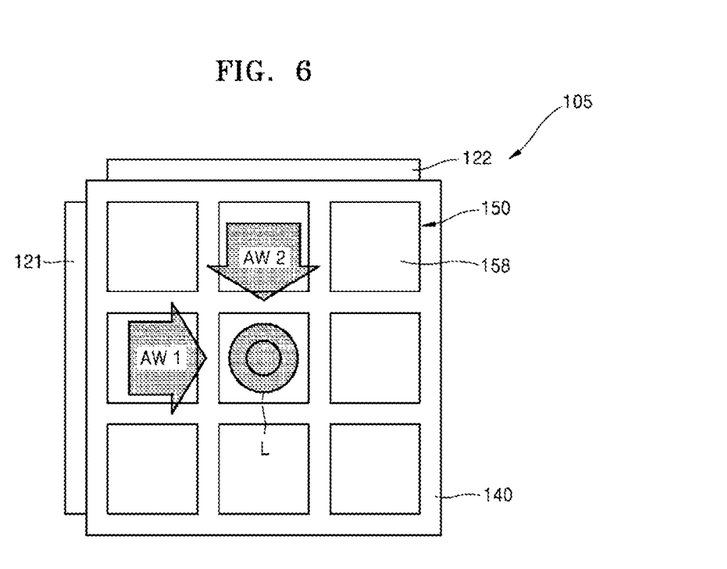
FIG. 6 is a plan view of a schematic structure of an acousto-optic device according to another exemplary embodiment.

FIG. 6 is a plan view of a schematic structure of an acousto-optic device 105 according to another exemplary embodiment.

In the present embodiment, an elastic-wave generating unit is provided to generate elastic waves that travel in two different directions. That is, this exemplary embodiment includes a first transducer 121 that is arranged on a first side of the elastic medium 110 and generates an elastic wave AW1 traveling in a first direction in the elastic medium 110, and a second transducer 122 that is arranged on a second side, adjacent to the first side, and generates an elastic wave AW2 traveling in a second direction, perpendicular to the first direction, in the elastic medium.

The elastic waves AW1 and AW2 generated from the first and second transducers 121 and 122 travel in different directions, and thus, periodic changes of refractive indexes in the elastic medium 110 are also made in different directions. Thus, the modulation range of the light L entering the acousto-optic device 105 may diversify.

Figure 7:
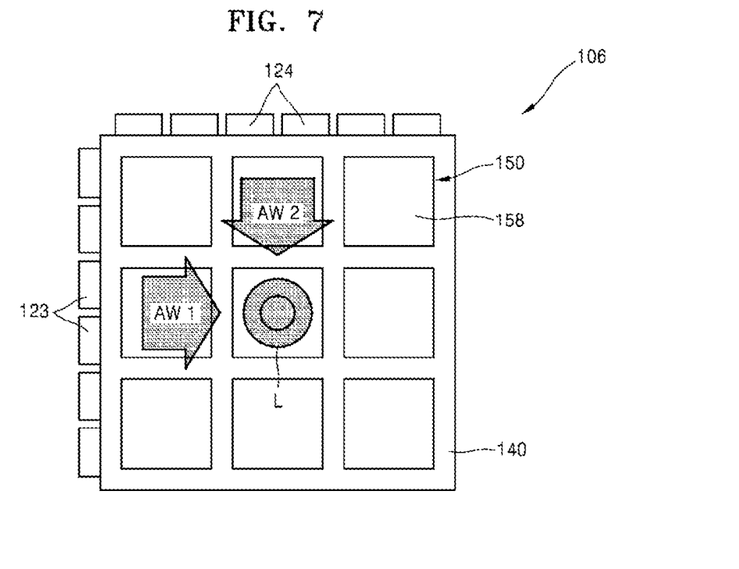
FIG. 7 is a plan view of a schematic structure of an acousto-optic device according to another exemplary embodiment.

FIG. 7 is a plan view of a schematic structure of an acousto-optic device 106 according to another exemplary embodiment.

The present embodiment includes a plurality of first transducers 123 that generate an elastic wave AW1 traveling in a first direction, and a plurality of second transducers 124 that generate an elastic wave AW2 traveling in a second direction perpendicular to the first direction.

Since the first transducers 123 and the second transducers 124 may generate elastic waves having different wavelengths and amplitudes or may selectively generate elastic waves, it is possible to diversify the change distribution of a refractive index in the elastic medium 110 and it is possible to diversify the modulation range of incident light L.

Figure 8:
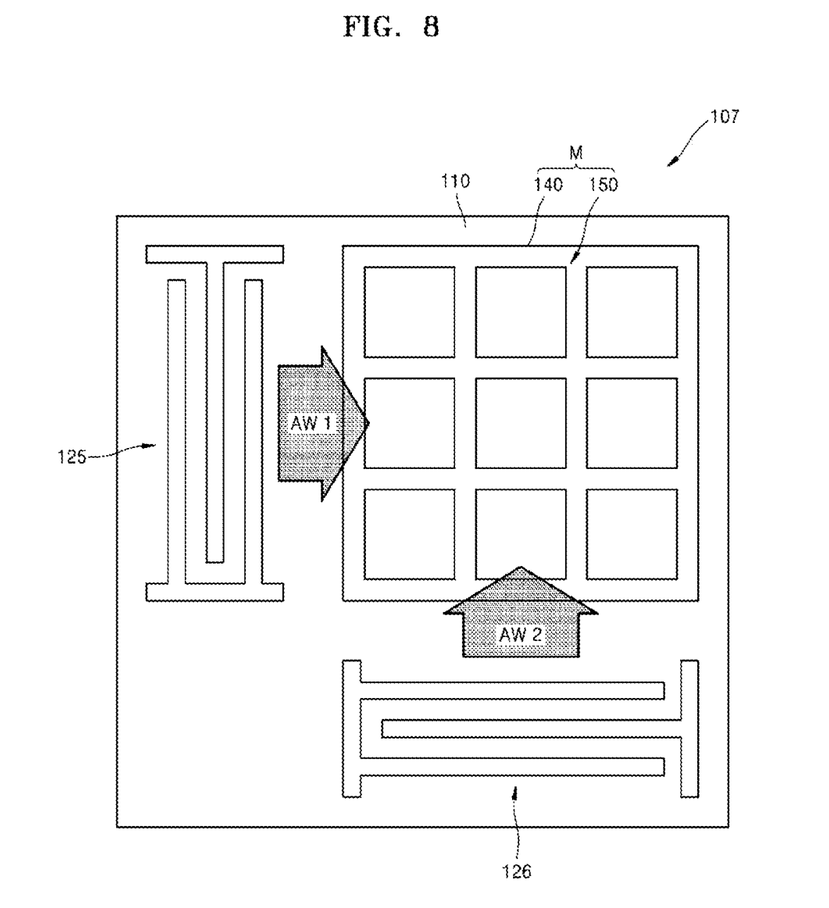
FIG. 8 is a plan view of a schematic structure of an acousto-optic device according to another exemplary embodiment.

FIG. 8 is a plan view of a schematic structure of an acousto-optic device 107 according to another exemplary embodiment.

According to the acousto-optic device 107 of the present embodiment, an elastic-wave generating unit is formed on the same surface of the elastic medium 110 as the upper surface of the elastic medium on which the meta structure layer M is disposed.

The elastic-wave generating unit may include one or more first transducers 125 that are arranged on the upper surface of the elastic medium 110 and generate an elastic wave AW1 that travels in a first direction toward the meta structure layer M along the upper surface of the elastic medium 110. In addition, the elastic-wave generating unit may further include one or more second transducers 126 that are arranged on the upper surface of the elastic medium 110 and generate an elastic wave AW2 that travels in a second direction perpendicular to the first direction, toward the meta structure layer M.

Since the elastic waves AW1 and AW2 that are generated from the first and second transducers 125 and 126 travel in different directions, periodic changes in refractive indexes of the elastic medium 110 and the meta structure layer M are also made in different directions. Thus, it is possible to diversify the modulation range of light entering the acousto-optic device 107.

Figure 9:
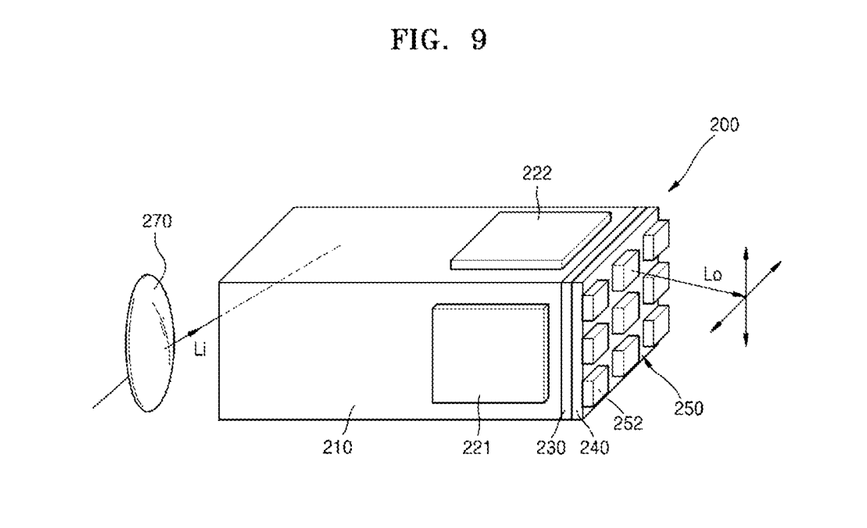
FIG. 9 is a perspective view of a schematic structure of an optical scanner according to an exemplary embodiment.

FIG. 9 is a perspective view of a schematic structure of an optical scanner 200 according to an exemplary embodiment.

The optical scanner 200 is an application of the structure of an acousto-optic device in which first and second transducers 221 and 222 are employed and generate elastic waves traveling in two directions that are perpendicular to each other. However, this is an example and it is also possible to scan light only in one direction with one transducer.

The optical scanner 200 includes an acousto-optic device and a light coupling device 270 to make light Li enter the acousto-optic device. The acousto-optic device includes an elastic medium 210, a meta structure layer M disposed on the elastic medium 210, an intermediate layer 230, a first layer 240, and a second layer 250. A first transducer 221 and a second transducer 222 are respectively arranged on two sides of the elastic medium 210.

The meta structure layer M includes the first layer 240 and the second layer 250 and may further include the intermediate layer 230. The second layer 250 is formed of pattern structures 252 that are repetitively arranged on the first layer 240. The first layer 240 may be formed of a dielectric material, and the pattern structures 252 may be formed of a conductive material such as metal, graphene, or conductive oxide. Alternatively, the first layer 240 may be formed of a conductive material such as metal, graphene, or conductive oxide, and the pattern structures 252 may be formed of a dielectric material. In the drawing, the second layer 250 is formed to have the pattern structures 252, however, this is an example and the embodiment is not limited thereto. The pattern structure can be made in the first layer 240 or in both the first layer 240 and second layer 250.

Light Li entering through a lower surface of the elastic medium 210, a surface opposite the upper surface on which the meta structure layer M is formed, travels in the elastic medium 210, and in this case, it is possible to adjust amplitudes and wavelengths of elastic waves generated by the first and second transducers 221 and 222 to adjust a direction of an output light Lo. A further component to make incident light Li travel in the elastic medium 210 may be further disposed on a side of the elastic medium 210, such as a reflective layer or a cladding layer, to contain light within the elastic medium by total internal reflection.

The optical scanner 200 of the embodiment employs an acousto-optic device with a meta structure layer M in order to increase acousto-optic conversion efficiency and may widen the scanning range of the optical scanner 200.

Figure 10:
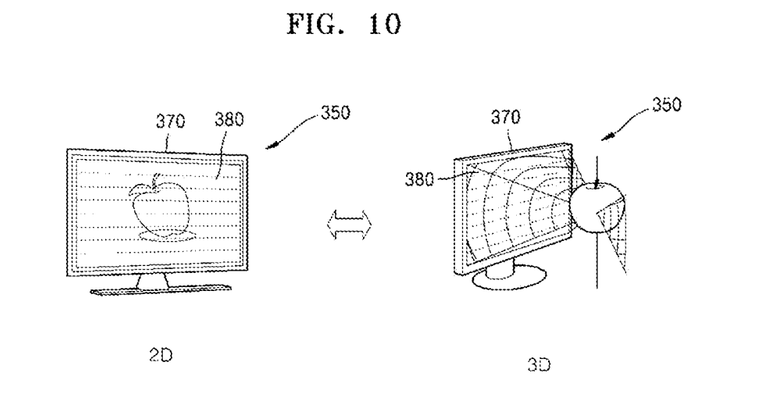
FIG. 10 is a schematic view of a 2D/3D switching 3D image display apparatus according to an exemplary embodiment.

FIG. 10 is a schematic view of a 2D/3D switching 3D image display apparatus 350 according to an exemplary embodiment.

The 2D/3D switching 3D image display apparatus 350 is an application of the acousto-optic devices according to the previous exemplary embodiments. For example, it is possible to manufacture a plurality of acousto-optic devices 380 that have the same width as that of a pixel of a display panel 370 and are horizontally extended, and it is possible to arrange the plurality of acousto-optic devices 380 on the surface of the display panel 370 to make them form an array in a vertical direction. Then, one acousto-optic device 380 may correspond to all or some pixels of a row of pixels of the display panel 370.

If an elastic wave is not applied to the array of acousto-optic devices 380, an image displayed on the display panel 370 passes through the array of acousto-optic devices 380 without deviation. In this case, as shown on the left side of FIG. 10, the display device 350 may operate in a 2D display mode. In a multi-view and 3D-image 3D display mode, each acousto-optic device 380 may generate information beams in a number of directions, and, as shown on the right side of FIG. 10, a viewer may view a 3D image. Alternatively, each acousto-optic device 380 may scan an output angle of incident light in a specific direction over time. In the case of a 2D display mode, it is possible to provide the same 2D image information with respect to each angle, and in the case of a 3D display mode, it is possible to provide a 3D image by representing image information varying depending on each angle.

Figure 11:
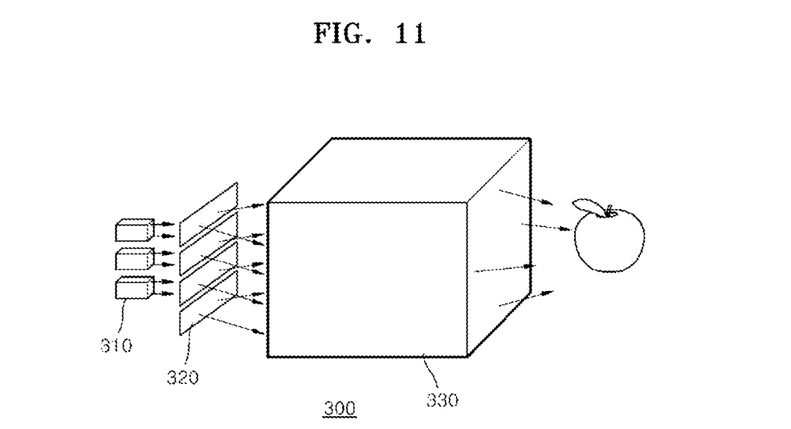
FIG. 11 is a schematic view of a holographic display apparatus according to an exemplary embodiment.

FIG. 11 is a schematic view of a holographic display apparatus 300 according to an exemplary embodiment.

The holographic display apparatus 300 is an application of the acousto-optic devices according to the previous exemplary embodiments. For example, the holographic display device 300 may include a light source 310, an array of acousto-optic devices 320, and a projection optical system 330. The light source 310 may be, e.g., a plurality of lasers. In addition, the array of acousto-optic devices 320 may be formed by manufacturing a plurality of horizontally extended acousto-optic devices 320 and arranging the acousto-optic devices 320 to make them form an array in a vertical direction. In this case, one acousto-optic device 320 may correspond to one or more rows of horizontal holograms of a hologram image displayed on the display apparatus 300. Rows of holograms diffracted from the acousto-optic devices 320 may be projected onto a predetermined space by the projection optical system 330 and thus form a 3D image.

Figure 12:
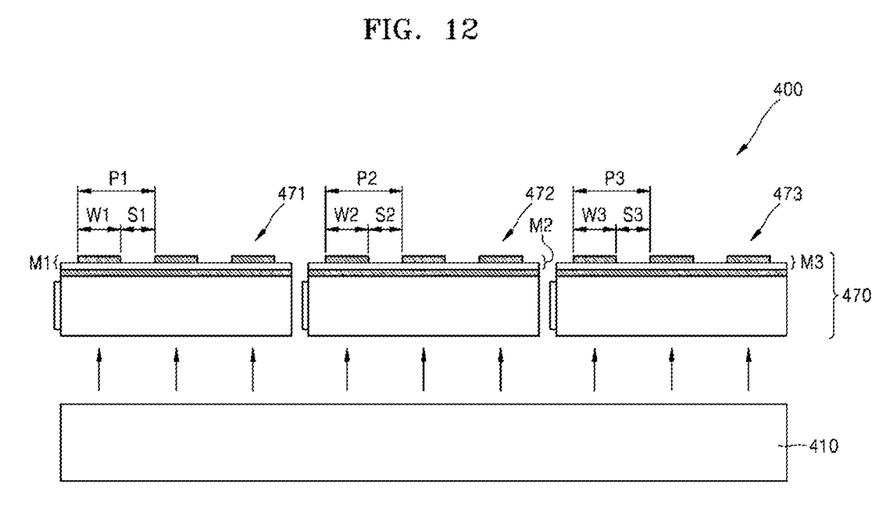
FIG. 12 is a schematic view of a display apparatus according to an exemplary embodiment.

FIG. 12 is a schematic view of a display apparatus 400 according to an exemplary embodiment.

The display apparatus 400 includes a backlight 410 to provide image-forming light and a display panel 470 to modulate, according to image information, the light provided from the backlight 410.

The display panel 470 has a structure in which a plurality of acousto-optic devices are 2-dimensionally arrayed, and in addition, meta structure layers of neighboring acousto-optic devices may be formed to have repetitive patterns of different shapes. As shown, the display panel 470 may include, e.g., a first acousto-optic device 471 including a first meta structure layer M1, a second acousto-optic device 472 including a second meta structure layer M2, and a third acousto-optic device 473 including a third meta structure layer M3. The first to third meta structure layers M1 to M3 may be formed to modulate amplitudes of light having different wavelengths such as light R, G, and B by properly setting widths W1 to W3, spacing S1 to S3, and periods P1 to P3 of patterns.

An acousto-optic device introduces a meta structure onto one surface of an elastic medium, thereby increasing a change level of an optical property by an elastic wave and increasing acousto-optic conversion efficiency.

Thus, the acousto-optic device may be applied to an optical scanner or various kinds of display apparatuses.

While exemplary embodiments have been particularly shown and described herein, it will be understood by those of ordinary skill in the art that various changes in form and details may be made therein without departing from the spirit and scope of the inventive concept as defined by the following claims.

What is claimed is:

1. An acousto-optic device for modulating incident light comprising:
    an elastic-wave generating unit which generates an elastic wave;
    an elastic medium to which the elastic wave generated in the elastic-wave generating unit is incident, a refractive index of the elastic medium being changed by the elastic wave;
    a meta structure disposed on an upper surface of the elastic medium and configured to increase a refractive index change of the elastic medium by the elastic wave, the meta structure consisting of a first layer formed of a dielectric material and a second layer formed on the first layer and formed of a conductive material, wherein the second layer has a predetermined repetitive pattern repeated along a direction parallel to a surface of the first layer; and
    an intermediate layer disposed between the elastic medium and the meta structure, the intermediate layer being formed of a conductive material and contacting the first layer;
    wherein the intermediate layer is configured to further increase the refractive index change of the elastic medium by the elastic wave and have a thickness smaller than skin depth with respect to a wavelength of the incident light.

2. The acousto-optic device of claim 1, wherein the elastic-wave generating unit comprises at least one first transducer disposed on a first side of the elastic medium adjacent to the upper surface of the elastic medium, wherein the at least one first transducer generates an elastic wave that travels in the elastic medium in a first direction.

3. The acousto-optic device of claim 2, wherein the elastic-wave generating unit comprises at least one second transducer disposed on a second side of the elastic medium, adjacent to the first side, wherein the at least one second transducer generates an elastic wave that travels in the elastic medium in a second direction perpendicular to the first direction.

4. The acousto-optic device of claim 1, wherein the elastic-wave generating unit comprises at least one first transducer disposed on the upper surface of the elastic medium, wherein the at least one first transducer generates an elastic wave that travels in the elastic medium in a first direction toward the meta structure.

5. The acousto-optic device of claim 4, wherein the elastic-wave generating unit comprises at least one second transducer disposed on the upper surface of the elastic medium, wherein the at least one second transducer generates an elastic wave that travels in the elastic medium in a second direction toward the meta structure, wherein the second direction is perpendicular to the first direction.

6. The acousto-optic device of claim 1, wherein the at least one of the first layer and the second layer comprises a plurality of strip-shaped structures repetitively arranged in a single direction.

7. The acousto-optic device of claim 1, wherein at least one of the first layer and the second layer comprises a plurality of structures repetitively arranged in a 2-dimensional array, wherein the plurality of structures are a plurality of polygonal structures, a plurality of circular structures, a plurality of ring-shaped structures, or a plurality of U-shaped structures.

8. The acousto-optic device of claim 1, wherein the thickness of the intermediate layer permits light to be transmitted through the elastic medium from a lower surface of the elastic medium to the upper surface of the elastic medium.

9. The acousto-optic device of claim 8, wherein a wave generated by the elastic-wave generating unit causes light, incident on the lower surface of the elastic medium, to be modulated in at least one of amplitude and direction upon transmission through the acousto-optic device.

10. The acousto-optic device of claim 1, wherein light entering the acousto-optic device through the meta structure is modulated in at least one of amplitude and direction and exits the acousto-optic device through the meta structure.

11. The acousto-optic device of claim 10, further comprising a reflective layer disposed on a lower surface of the elastic medium.

12. An optical scanner comprising:
the acousto-optic device of claim 1; and
a light coupling device which directs light to be incident on the acousto-optic device.

13. The optical scanner of claim 12, wherein the light coupling device is a lens.

14. A 2D/3D switchable 3D image display apparatus comprising:
a display panel; and
an array of a plurality of acousto-optic devices disposed on a front side of the display panel, wherein the plurality of acousto-optic device modulate light and direct the modulated light to form an image displayed on the display panel, wherein each of the plurality of acousto-optic devices comprises the acousto-optic device of claim 1.

15. A holographic display apparatus comprising:
a light source which emits light;
an array of a plurality of acousto-optic devices which modulate light incident thereon from the light source, wherein each of the plurality of acousto-optic devices comprises the acousto-optic device of claim 1; and
a projection optical system which projects light incident thereon from the plurality of acousto-optic devices.

16. A display apparatus comprising:
a backlight which emits light; and
a display panel which modulates, according to image information, the light emitted from the backlight, wherein the display panel comprises a two-dimensional array of a plurality of acousto-optic devices, wherein each of the plurality of acousto-optic devices comprises the acousto-optic device of claim 1.

17. The display apparatus of claim 16, wherein at least one of the first layer and the second layer of each of the plurality of acousto-optic devices comprises a repetitive pattern of different shapes.

* * * * *